United States Patent

Klein

[15] 3,638,996
[45] Feb. 1, 1972

[54] PANCRATIC OCULAR FOR MICROPHOTOGRAPHY

[72] Inventor: Walter Klein, Wissmar, Germany
[73] Assignee: Firma Ernst Leitz GmbH, Wetzlar, Germany
[22] Filed: Dec. 2, 1969
[21] Appl. No.: 881,402

[30] Foreign Application Priority Data
Dec. 12, 1968  Germany.................P 18 14 132.7

[52] U.S. Cl..........................350/184, 350/175 E, 350/216
[51] Int. Cl. ................................................G02b 15/00
[58] Field of Search ..........................350/184–187, 43

[56] References Cited

UNITED STATES PATENTS

| | | | |
|---|---|---|---|
| 2,741,155 | 4/1956 | Hopkins | 350/184 |
| 2,988,955 | 6/1961 | Goto et al. | 350/187 X |
| 3,367,734 | 2/1968 | Bystricky et al. | 350/220 X |

*Primary Examiner*—John K. Corbin
*Attorney*—Krafft & Wells

[57] ABSTRACT

A pancratic Huygens-type ocular system, preferably for use with microphotography apparatuses, composed of a stationary front lens and a stationary eyelens between which two lens elements are displaceable in the direction of the optical axis. The first displaceable lens element is a negative lens movable from the real image plane towards the front lens, while the second displaceable lens element is a positive lens movable from the real image plane towards the eyelens.

2 Claims, 5 Drawing Figures

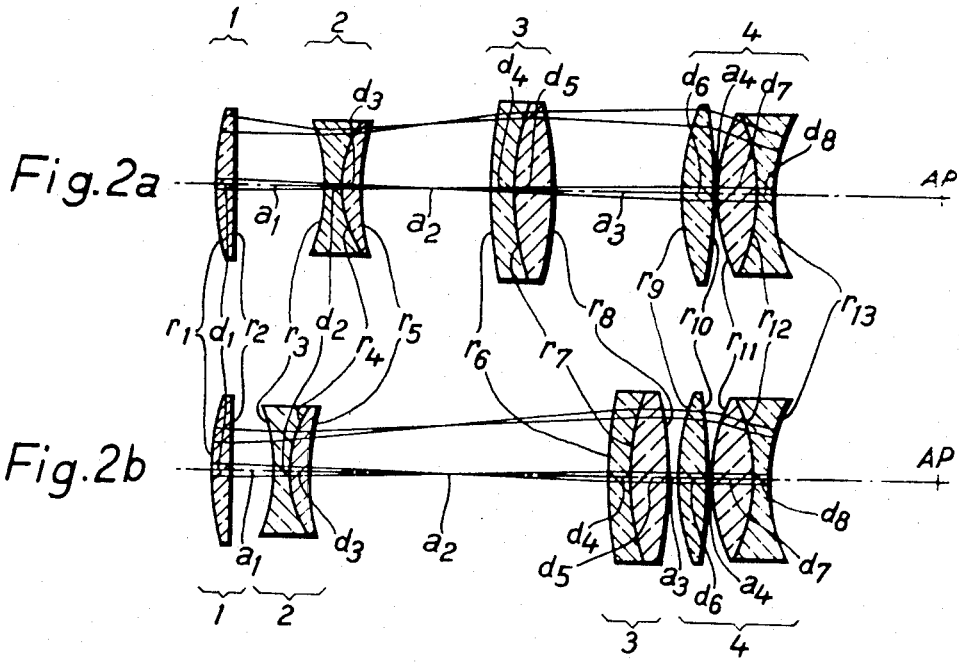
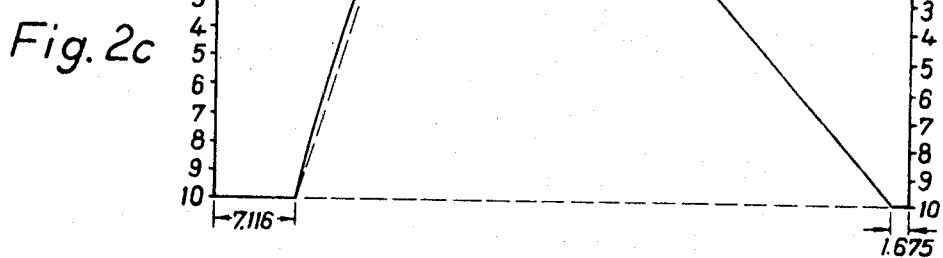
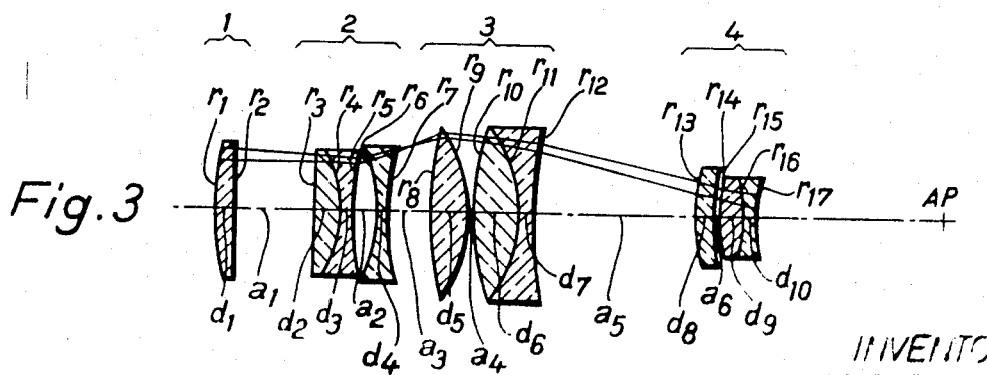

PANCRATIC OCULAR FOR MICROPHOTOGRAPHY

BACKGROUND OF THE INVENTION

The present invention pertains to pancratic oculars mainly for microphotographic apparatuses.

In this particular art it is well known to mount photographic cameras on microscopes in a manner which allows for an additional variation of the total magnification. Such additional magnification is usually not provided when the object is only visually observed. The additional magnification is needed for covering different film formats when different cameras are used or for adjusting the format to certain standardized picture sizes.

In order to comply with these requirements various designs have already been developed. One example of such a design being the so-called bellows-type camera which is, as a rule, mounted vertically displaceable on a rail above the microscope. Further examples are interchangeable oculars and revolving ocular mounts. However, all these designs are rather complicated in operation and besides they result in a somewhat bulky microscope construction.

It is therefore an object of the present invention to provide an ocular for microphotographic purposes by means of which the total magnification of the microscope can be altered for adjusting the image size to various requirements.

SUMMARY OF THE INVENTION

The above-stated object is attained by employing a pancratic ocular in the tube of the microphotographic camera. Pancratic oculars (not for use in microphotography) are already known in the art, for example, by the U.S. Pat. No. 3,454,321, issued July 8, 1969 to the applicant. These pancratic oculars have a magnification range of 1.6 to 6.3. Now, the magnification range of 1:4 as such would be perfectly sufficient even for microphotographic purposes, however, the largest magnification of 6.3× is by far not large enough for use in microscopes. With microscopes magnifications are usually needed which range between 6.3× and 25× and which, up to the present, can only be provided with a plurality of individual and separate oculars.

It has now been discovered by the inventor that the required large magnification can be achieved with a pancratic ocular of the Huygens type, comprising stationarily mounted front and eyelenses and between them two lens elements, one of which is displaceable in the direction of the optical axis from the real intermediate image plane to the front lens and the other one being displaceable in the direction to the eyelens. Preferably, the displaceable lens elements are cemented achromats and displacement of one element is accomplished linearly, while the other one is moved by a cam. If, however, a 25× magnification is to be achieved the movable lens elements should be assembled from three component lenses each, two of which are cemented.

A pancratic ocular of such design gives lowest magnification when the two displaceable lens elements are positioned close by the real intermediate image plane. If moved away from this position the magnification increases. How close to the real intermediate image plane both lens elements can be brought depends on the desired image quality, which is reduced if the lens elements are moved too close to that image plane. Further, if the lenses are positioned too close to the real intermediate image plane dust particles which may have settled on the lenses will be imaged on the film.

BRIEF DESCRIPTION OF THE DRAWINGS

The invention will be more readily comprehended from the following description when taken in conjunction with the appending drawings, wherein:

FIG. 2a shows an ocular corresponding to the data given in example 1 of the following Table, FIG. 2b shows the ocular of FIG. 2a with the displaceable lenses in the position of the greatest magnification, FIG. 2c is a schematic representation of the displacement ranges of the movable lenses, FIG. 3 shows an ocular corresponding to the data given example Example 3 of the following table 1.

DESCRIPTION OF THE PREFERRED EMBODIMENTS

Figure 1:
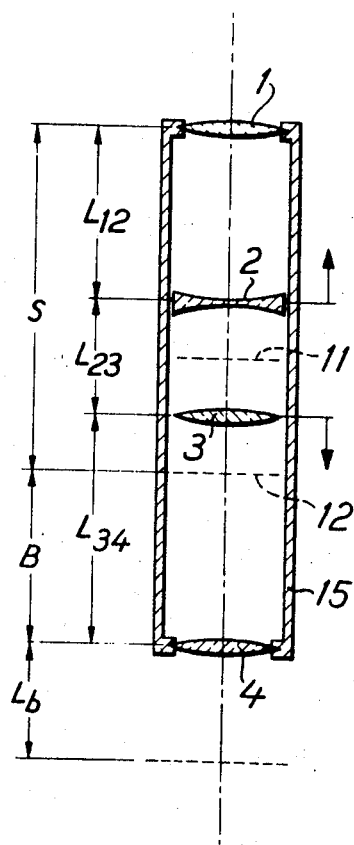
FIG. 1 shows schematically the design of the invented ocular having thin lenses.

In FIG. 1 the front lens is denoted by the numeral 1. The lens 2 is a negative lens which is displaceable along the optical axis from the real intermediate image plane 11 in the direction to the front lens 1. Lens 4 is the eyelens of the ocular, and lens 3 is a positive lens which is movable from the real intermediate image plane 11 towards the eyelens 4. The virtual intermediate image plane 12 of the microscope is located between the real intermediate image plane 11 and the eyelens 4. The spacings between the various lenses are denoted by the reference symbols $L_{12}$, $L_{23}$ and $L_{34}$. The spacing between the front lens 1 and the virtual intermediate image plane 12 is denoted by the letter S and the distance from this plane to the eyelens 4 is designated by B. The distance between the eyelens 4 and the image plane of the ocular is denoted by $L_b$. All lenses are mounted in a schematically shown housing 15.

In the following Table 1 three examples are given for oculars having different ranges of magnification. The focal lengths of the lenses are designated from $f_1$ to $f_4$.

TABLE 1

| | 1. Example | 2. Example | 3. Example |
|---|---|---|---|
| Magnification | 6.29×–10.27× | 6.30×–12.15× | 6.25×–25.06× |
| S | 44.64 | 42.86 | 36.28 |
| B | 28.13 | 26.16 | 32.41 |
| $L_b$ | ∞ | ∞ | 214.71 |
| $f_1$ | +91.49 | +100.00 | +105.51 |
| $f_2$ | –42.0 | –35.0 | –22.0 |
| $f_3$ | +80.0 | +55.0 | +24.0 |
| $f_4$ | +43.70 | +39.39 | +36.40 |
| $L_{12}$ | 20.09–11.99 | 24.17–14.64 | 23.17–13.40 |
| $L_{23}$ | 28.97–59.07 | 15.46–47.98 | 77.70–50.47 |
| $L_{34}$ | 23.70–1.70 | 29.39–6.39 | 33.83–4.83 |

The data of the ocular shown in FIGS. 2a and 2b wherein the radii $r$ of the lenses and their components taken in the direction of the object to the image, the successive axial thicknesses $d$ of the lenses and their components and the axial lengths $a$ of the air spaces between the lenses are of the size given in the following table, the respective indices $n_e$ of the lens and lens component glasses, taken on the $e$-line, and the Abbe number $v_e$ of the glasses also appear in the following table; the distance between the front surface of the front lens and the real intermediate image plane being 44.5883, and the distance between the rear surface of the eyelens and the exit pupil being 29.82 at a 6.3× magnification and being 24.94 at a 10.3× magnification:

| | | $n_e$ | $v_e$ |
|---|---|---|---|
| $r_1$=+52.467 | | | |
| | $d_1$=3.5 | 1.57125 | 55.85 |
| $r_2$=∞ | | | |
| | $a_1$=15.2423–7.1184 | | |
| $r_3$=–49.563 | | | |
| | $d_2$=3.5 | 1.60973 | 59.19 |
| $r_4$=+20.4 | | | |
| | $d_3$=3.5 | 1.79190 | 25.55 |
| $r_5$=+39.567 | | | |
| | $a_2$=23.7168–53.9711 | | |
| $r_6$=+104.609 | | | |
| | $d_4$=4.0 | 1.79190 | 25.55 |
| $r_7$=+46.72 | | | |
| | $d_5$=6.5 | 1.60973 | 59.19 |
| $r_8$=–67.352 | | | |
| | $a_3$=23.8057–1.6753 | | |
| $r_9$=+40.352 | | | |
| | $d_6$=6.3 | 1.59149 | 50.81 |
| $r_{10}$=–120.25 | | | |
| | $a_4$=0.2 | | |
| $r_{11}$=+32.135 | | | |
| | $d_7$=7.8 | 1.48914 | 70.22 |
| $r_{12}$=–36.516 | | | |

| | | | |
|---|---|---|---|
| $r_{13}=+94.117$ | $d_4=3.1$ | 1.73430 | 28.19 |

Therein, the axial lengths of the air spaces between the lenses are denoted $a_1$ to $a_4$, the thicknesses of the lenses are $d_1$ to $d_8$, and the lens radii are $r_1$ to $r_{13}$. This ocular is corrected in the manner of a compensating ocular and the front lens is only one positive lens, while the moving lens elements 2 and 3 comprise two cemented component lenses having opposite refractive power. The eyelens 4 comprises one single positive lens and one lens element of two component lenses also having opposite refractive power. As can be seen from the drawing the exit pupil AP is located relatively distant from the last lens surface. This is very much desired since the shutter of the photographic camera is to be disposed in the exit pupil. The diagram shown in FIG. 2c illustrates that the path of movement of lens element 2 and consequently the cam moving this element is very simple.

The following table gives the Seidel coefficient both at a 6.3× magnification and at a 10× magnification.

TABLE 2

| | V=6.3× | V=10× |
|---|---|---|
| ΣA | +0.0000631 | −0.0000915 |
| ΣB | +0.001163 | +0.002852 |
| ΣΓ | −0.0141 | −0.0175 |
| ΣP | +0.0134 | +0.0134 |
| ΣΔ | +0.309 | +0.527 |
| ΣF₁ | +0.0033 | +0.0463 |
| ΣF₂ | −0.798 | −0.736 |

FIG. 3 shows a pancratic ocular according to the invention having a magnifying power of V=6.22 if the movable lens elements are in one of their end positions and having a magnifying power of V=24.63 if the movable lens elements are in the other end position. Because of the relatively large magnification of 25 the movable lens elements must be of short individual focal lengths. It is, therefore, advantageous to assemble the movable lens elements from three component lenses each, as has been done in the example illustrated in FIG. 3.

The exact data of this ocular wherein the radii $r$ of the lenses and their components taken in the direction of the object to the image, the successive axial thicknesses $d$ of the lenses and their components and the axial lengths $a$ of the air spaces between the lenses are of the size given in the following table, the respective indices $n_e$ of the lens and lens component glasses, taken on the $e$-line, and the Abbe number $v_e$ of the glasses also appear in the following table:

| | | $n_e$ | $v_e$ |
|---|---|---|---|
| $r_1=+68.805$ | $a_n=+36.29$ | | |
| $r_2=\infty$ | $d_1=2.5$ | 1.65221 | 33.6 |
| $r_3=\infty$ | $a_1=14.446-4.631$ | | |
| $r_4=-16.063$ | $d_2=4.5$ | 1.73430 | 28.2 |
| $r_5=+50.06$ | $d_3=2.5$ | 1.69400 | 54.5 |
| $a_2=4.0$ | | | |
| $r_6=-25.46$ | | | |
| $r_7=+72.887$ | $d_4=2.5$ | 1.60973 | 59.2 |
| | $a_3=7.897-46.211$ | | |
| $r_8=+75.174$ | | | |
| $r_9=-24.58$ | $d_5=6.5$ | 1.60973 | 59.2 |
| $r_{10}=+33.645$ | $a_4=0.2$ | | |
| $r_{11}=-23.666$ | $d_6=8.5$ | 1.60973 | 59.2 |
| $r_{12}=+109.142$ | $d_7=3.0$ | 1.73430 | 28.2 |
| $r_{13}=+22.253$ | $a_5=28.601-0.100$ | | |
| $s_{14}=+135.232$ | $d_8=3.6$ | 1.61075 | 40.0 |
| $r_{15}=+18.142$ | $a_6=0.1$ | | |
| | $d_9=4.3$ | 1.50207 | 61.2 |
| $r_{16}=-25.824$ | | | |
| $r_{17}=+38.092$ | $d_{10}=1.7$ | 1.73431 | 28.5 |
| | $a_b=205.75$ | | |

The Seidel coefficients for the two end positions of the movable lens elements are listed in the following table 3.

TABLE 3

| | V=6.22× | V=24.63× |
|---|---|---|
| ΣA | +0.00023 | −0.00511 |
| ΣB | +0.00012 | +0.00691 |
| ΣΓ | −0.0237 | −0.0256 |
| ΣP | +0.0224 | +0.0224 |
| ΣΔ | +0.45 | +0.73 |
| ΣF₁ | +0.0043 | +0.632 |
| ΣF₂ | −1.16 | −0.61 |

As can be seen from the disclosed examples, it is perfectly possible table design a pancratic ocular for use with a photographic camera on microscopes so that it will require only little room. This will particularly be comprehended when comparing the values S and B in Table 1. From the Tables 2 and 3 it can be seen that a lens design according to the invention provides an ocular of high quality correction, as is requested from compensation oculars on microscopes.

What is claimed is:

1. A pancratic ocular for use with microphotographic apparatus, comprising a stationary mounted positive front lens, first and second adjustable lens elements, said first lens element being negative and said second lens element being positive, and a stationary mounted eyelens having a positive refractive power, said ocular being of the Huygens type wherein said front lens produces a real intermediate image plane between said first and second adjustable lens elements and wherein said adjustable lens elements are movable away from said real intermediate image plane in the direction of said stationary mounted front lens and said stationary mounted eyelens respectively, wherein the radii $r$ of the lenses and their components taken in the direction of the object to the image, the successive axial thicknesses $d$ of the lenses and their components and the axial lengths $a$ of the air spaces between the lenses are of the size given in the following table, the respective indices $n_e$ of the lens and lens component glasses, taken on the $e$-line, and the Abbe number $v_e$ of the glasses also appear in the following table; the distance between the front surface of the front lens and the real intermediate image plane being 45.5883, and the distance between the rear surface of the eyelens and the exit pupil being 29.82 at a 6.3× magnification and being 24.94 at a 10.3× magnification:

| | | $n_e$ | $v_e$ |
|---|---|---|---|
| $r_1=+52.467$ | $d_1=3.5$ | 1.57125 | 55.85 |
| $r_2=\infty$ | | | |
| | $a_1=15.2423-7.1184$ | | |
| $r_3=-49.563$ | $d_2=3.5$ | 1.60973 | 59.19 |
| $r_4=+20.4$ | $d_3=3.5$ | 1.79190 | 25.55 |
| $r_5=+39.567$ | | | |
| | $a_2=23.7168-53.9711$ | | |
| $r_6=+104.609$ | $d_4=4.0$ | 1.79190 | 25.55 |
| $r_7=+46.72$ | | | |
| $r_8=-67.352$ | $d_5=6.5$ | 1.60973 | 59.19 |
| | $a_3=23.8057-1.6753$ | | |
| $r_9=+40.352$ | $d_6=6.3$ | 1.59149 | 50.81 |
| $r_{10}=-120.25$ | | | |
| | $a_4=0.2$ | | |
| $r_{11}=+32.135$ | $d_7=7.8$ | 1.48914 | 70.22 |
| $r_{12}=-36.516$ | | | |
| $r_{13}=+94.117$ | $d_8=3.1$ | 1.73430 | 28.19 |

2. A pancratic ocular for use with microphotographic apparatus, comprising a stationary mounted positive front lens, first and second adjustable lens elements, said first lens element being negative and said second lens element being positive, and a stationary mounted eyelens having a positive refractive power, said ocular being of the Huygens type wherein said front lens produces a real intermediate image plane between said first and second adjustable lens elements and wherein said adjustable lens elements are movable away from said real intermediate image plane in the direction of said stationary mounted front lens and said stationary mounted eyelens respectively, wherein the radii $r$ of the lenses and their components taken in the direction of the object to the image, the successive axial thicknesses $d$ of the lenses and their components and the axial lengths $a$ of the air spaces between the lenses are of the size given in the following table, the respective indices $n_e$ of the lens and lens component glasses, taken on the $e$-line, and the Abbe number $v_e$ of the glasses also appear in the following table:

| | | $n_e$ | $v_e$ |
|---|---|---|---|
| $r_1 = +68.805$ | $a_0 = +36.29$ | | |
| $r_2 = \infty$ | $d_1 = 2.5$ | 1.65221 | 33.6 |
| $r_3 = \infty$ | | | |
| $r_4 = -16.063$ | | | |
| $r_5 = +50.06$ | | | |
| $r_6 = -25.46$ | | | |
| $r_7 = +72.887$ | | | |
| $r_8 = +75.174$ | | | |
| $r_9 = -24.58$ | | | |
| $r_{10} = +33.645$ | | | |
| $r_{11} = -23.666$ | | | |
| $r_{12} = +109.142$ | | | |
| $r_{13} = +22.253$ | | | |
| $r_{14} = +135.232$ | | | |
| $r_{15} = +18.142$ | | | |
| $r_{16} = -25.824$ | | | |
| $r_{17} = +38.092$ | | | |
| | $a_1 = 14.446 - 4631$ | | |
| | $d_2 = 4.5$ | 1.73430 | 28.2 |
| | $d_3 = 2.5$ | 1.69400 | 54.5 |
| | $a_2 = 4.0$ | | |
| | $d_4 = 2.5$ | 1.60973 | 59.2 |
| | $a_3 = 7.897 - 46.211$ | | |
| | $d_5 = 6.5$ | 1.60973 | 59.2 |
| | $a_4 = 0.2$ | | |
| | $d_6 = 8.5$ | 1.60973 | 59.2 |
| | $d_7 = 3.0$ | 1.73430 | 28.2 |
| | $a_5 = 28.601 - 0.100$ | | |
| | $d_8 = 3.6$ | 1.61075 | 40.0 |
| | $a_6 = 0.1$ | | |
| | $d_9 = 4.3$ | 1.50207 | 61.2 |
| | $d_{10} = 1.7$ | 1.73431 | 28.5 |
| | $a_6 = 205.75$ | | |

* * * * *